United States Patent [19]

Smith

[11] 4,351,928

[45] Sep. 28, 1982

[54] CURABLE HYDROXY FUNCTIONAL RESIN COMPOSITIONS CONTAINING REACTIVE DILUENTS

[75] Inventor: Harry A. Smith, Midland, Mich.

[73] Assignee: The Dow Chemical Company, Midland, Mich.

[21] Appl. No.: 314,824

[22] Filed: Oct. 26, 1981

Related U.S. Application Data

[63] Continuation-in-part of Ser. No. 187,932, Sep. 17, 1980, abandoned, which is a continuation-in-part of Ser. No. 62,604, Aug. 1, 1979, abandoned.

[51] Int. Cl.$^3$ .................... C08L 67/02; C08L 61/28
[52] U.S. Cl. ................................. 525/443; 525/58; 525/138; 525/143; 525/162; 525/442; 525/481; 525/485; 525/511
[58] Field of Search ............... 525/58, 138, 143, 162, 525/442, 443, 481, 485, 511; 260/33.4 P, 32.6 N, 38, 39 R

[56] References Cited

U.S. PATENT DOCUMENTS

| | | | |
|---|---|---|---|
| 3,390,118 | 6/1968 | Bach et al. | 260/33.4 |
| 3,449,228 | 6/1969 | Yurcheshen | 204/181 |
| 3,538,186 | 11/1970 | Payette | 260/839 |
| 3,920,595 | 11/1975 | Anderson et al. | 260/22 CQ |

*Primary Examiner*—Theodore E. Pertilla
*Attorney, Agent, or Firm*—Douglas N. Deline; David H. Fifield

[57] ABSTRACT

A four-component composition is disclosed comprising a hydroxyl-bearing polymer; a liquid, amino- or hydroxyaromatic diluent having an atmospheric boiling point of about 150° C. or greater; an aminoplast or phenolic resin capable of curing the hydroxyl-bearing polymer and a strong acid catalyst for the reaction between the first and third components. Optionally, a pigment may be added to the composition.

14 Claims, No Drawings

CURABLE HYDROXY FUNCTIONAL RESIN COMPOSITIONS CONTAINING REACTIVE DILUENTS

CROSS-REFERENCE TO RELATED APPLICATION

This is a continuation-in-part of copending application Ser. No. 187,932, filed Sept. 17, 1980, now abandoned which is a continuation-in-part of copending application Ser. No. 62,604, filed Aug. 1, 1979, now abandoned. U.S. Pat. No. 4,256,622, filed Apr. 18, 1978, discloses curable compositions having polyglycol ether diluents.

BACKGROUND OF THE INVENTION

The invention relates to the use of a reactive diluent in common coating compositions made up of hydroxy-functional resins which are curable, by means of an aminoplast or phenolic resin, upon heating in the presence of a strong acid catalyst. Presently, low boiling diluents are employed as solvents for coating compositions and are removed upon heating said compositions in the curing process.

SUMMARY OF THE INVENTION

The instant invention comprises standard coating mixtures of hydroxy-functional resins in admixture with aminoplast or phenolic curing agents therefor and a catalyst for the reaction between the two and, as a reactive diluent, a liquid, amino- or hydroxyaromatic compound which boils at greater than or equal to about 150° C. at 760 mm mercury pressure. The invention composition differs from the solvent-based coatings previously employed in the art in that it may be permanently incorporated in the final coating instead of being evaporated out as is commonly the case and the resultant coatings do not suffer losses in their physical properties as might be expected.

The invention comprises a curable composition consisting essentially of component (A) x parts by weight of a hydroxyl-bearing polymer; about 0.10x to about 0.60x parts by weight, which represents y-moles of component (B) a liquid, organic diluent represented by the formula $R(Z)_b$ wherein R is an aromatic radical of valence b having at least one reactive ring position located ortho or para to a Z substituent, b is an integer from 1 to 3 and Z is a —NH$_2$ or —OH group, said diluent having an atmospheric boiling point of about 150° C. or greater; component (C) an aminoplast or phenolic resole capable of curing component (A) to a tack-free state, present in from about (0.20x + z) to about (0.50x + 2.5z) parts by weight, z being equal to y multiplied by the equivalent weight of component (C); and component (D) a catalytic amount of a strong acid catalyst for the reaction between components (A) and (C). The invention further comprises the above composition which has been heated at a temperature and for a length of time sufficient to cure same to a tack-free finish. The invention composition optionally contains a pigment of the nature commonly employed in paints and other compositions.

DETAILED DESCRIPTION OF THE INVENTION

Component (A) of the invention is suitably any hydroxyl-bearing polymer which is commonly cured with an aminoplast or phenolic resin to form films and coatings. Component (A) suitably has at least two and preferably three or more free-hydroxyl groups. Such polymers are the free-hydroxyl containing polyesters such as are obtained by condensing di- or polycarboxylic acids with diols, glycols, triols or higher polyols in such a fashion and ratios that free-hydroxyls remain unreacted for further curing by means of the aminoplast resin. Solid epoxy resins, such as extended diglycidyl ethers of bisphenols, for example:

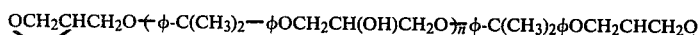

wherein n > 1, are also suitable as component (A).

Another class of polymers suitably employed as component (A) are those obtained by polymerization of the unsaturated portion of vinyl monomers which bear or may be modified to bear free-hydroxyl groups which are ultimately pendant from the polyethylenic backbone. Examples of such polymers are poly(vinyl alcohols) which may be obtained by the hydrolysis of polymers derived from the polymerization of vinyl acetate with or without other vinylic unsaturated comonomers, from poly(hydroxyalkylacrylates) such as hydroxyethylacrylate and hydroxypropylacrylate with or without other comonomers and poly($\alpha,\beta$-unsaturated acids) derived from the polymerization of $\alpha,\beta$-unsaturated monomeric acids with or without other comonomers or by the polymerization and subsequent hydrolysis of esters thereof. Such monomeric acids are acrylic acid, methacrylic acid, itaconic acid, maleic acid, citraconic acid, cinnamic acid and the like.

Component (A) polymers are employed in some arbitrary amount, hereafter designated as x parts by weight.

Component (B) comprises about 0.10x to about 0.60x parts by weight, preferably about 0.20x to about 0.50x and most preferably about 0.30x to about 0.40x parts by weight, of a liquid, hydroxyl- or amino-bearing aromatic diluent represented by the formula $R(Z)_b$ having at least one reactive ring position located ortho or para to a Z substituent, where R, Z and b are defined as above, which diluent has an atmospheric boiling point (i.e., the boiling point at 760 mm mercury) of about 150° C. or greater. Component (B) is a liquid at or below the usual curing temperature for the invention composition. Preferably, Component (B) is liquid at or below about 150° C., more preferably below about 120° C. and most preferably below about 60° C. Alternatively, Component (B) is liquefiable at temperatures below the curing temperature by addition of minor amounts of water or other solvents such as polyglycol ethers or high boiling alcohols which do not irreversibly react with the curing agent, component (C).

Preferably, in the aromatic diluent, b is the integer 1 or 2, more preferably 1. Preferably, Z is an -OH group. Suitable classes of aromatic diluents are aniline and the lower alkyl-substituted anilines (xylidines and toluidines) and phenol, cresols, xylenols and other lower alkyl-substituted phenols.

Selected embodiments of the diluent, Component (B), are shown in the following table together with their approximate atmospheric boiling points.

TABLE I

| Component (B) | |
|---|---|
| Diluent | Approximate Atmospheric Boiling Point, °C. |
| aniline | 184 |
| xylidines (various isomers) | 218–225 |
| ethylaniline (o-, m-, p-isomers) | 210–216 |
| toluidine (o-, m-, p-isomers) | 200–205 |
| phenol | 182 |
| cresols (o-, m-, p-isomers) | 191–203 |
| xylenols (various isomers) | 203–205 |
| 1-napthol | 278 |

Preferably, Component (B) has an atmospheric boiling point of about 160° C. or greater, more preferably 175° C. or greater and preferably has an atmospheric boiling point of about 400° C. or less and more preferably 300° C. or less.

Component (C) is an aminoplast or phenolic resole resin, capable of curing component (A) to a tack-free state, and is unreactive in the composition under normal conditions but becomes reactive with component (A) at elevated temperatures on the order of 100° C.–250° C., preferably 125° C.–200° C. for a time sufficient to create the desired tack-free state, usually about 5–60 minutes or more. Suitable curing agents are aminoplast resins containing unreacted methylol moieties, e.g., an aminoplast resin which has not been modified by reaction with an alkyl phenol (hereinafter in the specification and claims aminoplast shall mean an aminoplast which has not been modified by reaction with an alkyl phenol). Examples of aminoplast resins are melamine-formaldehyde condensation products or urea-formaldehyde condensation products commonly available for this purpose. Examples of phenolic resole resins are such resins derived from the condensation of phenols and aldehydes and which are commonly used to cure the hydroxy-bearing solid epoxy resins previously described.

The quantity of component (C) to be employed is such that from about the sum of $0.20x+z$ up to about the sum of $0.50x+2.5z$ parts by weight of the aminoplast or phenolic resin are present in the invention composition, z being equal to y multiplied by the equivalent weight of component (C). The equivalent weights of aminoplast and phenolic resins are commonly available from the manufacturers thereof. Preferably, component (C) is present in at least about the sum of $0.20x+1.25z$ and is more preferably at least about the sum of $0.20x+1.5z$. Preferably, it is present in less than about the sum of $0.50x+2z$; and most preferably in less than about the sum of $0.50x+1.85z$.

Component (D) is a catalyst which catalyzes the reaction between the hydroxyl-bearing component (A) polymer and the aminoplast or phenolic curing agent which is component (C). Suitably, any strong acid may be employed for this purpose. Typical such catalysts are organosulfonic acids or their amine salts, sulfuric acid or its amine salts, zinc fluoroborate, phosphoric acid, boron trifluoride, (or its etherate), and the like. An organosulfonic acid or its amine salt such as toluenesulfonic acid is preferred as component (D). Suitably, about $0.0005x$ to about $0.05x$ part by weight of component (D) are sufficient to catalyze the curing reaction, and preferably more than about $0.001x$ and preferably less than about $0.025x$ part by weight is employed.

The curable composition of the invention is suitably prepared by simply mixing the four components in any order at ambient temperature or slightly elevated temperatures less than the temperature required for the curing reaction. The curable composition of the invention may suitably be heated to about 50° C.–100° C. without effecting a premature cure. This facilitates handling, mixing and application of the invention composition. If desired, standard pigments such as titanium oxides, chromium oxides, zinc oxides and the like may be added in suitable amounts to impart a desired color to the invention composition. Similarly, surfactants or wetting agents may optionally be added to the composition as is common in the art.

The invention composition is applied to a substrate by any suitable means to form a film or coating thereon and the film or coating is then heated to the curing temperature by means commonly used in the art such as a hot air oven, a bank of infrared heat lamps or the like.

SPECIFIC EMBODIMENTS

The following examples serve to illustrate the composition of the invention, the curing and employment thereof for the preparation of films and coatings. Unless otherwise designated, the term "parts" when employed herein means parts by weight. "Hot tack" is measured by drawing a wooden tongue depressor across a cured coating immediately after curing. If no mark is visible, the coating is considered tack-free. Delamination of cured films after ten minute immersion in boiling water is also observed.

EXAMPLE 1

About 5 grams of a commercial polyester sold under the name Cargill Polyester 5760 and containing 10 percent ethoxyethyl acetate is blended with about 1.64 grams of 2-tert.-butyl phenol as component (B). About 3.20 grams Cymel 301 hexamethoxymethyl melamine (equivalent weight of 65.1) is added to component (C), this amount being equal to about $0.43x+1.79z$ parts by weight, and about 0.12 gram of a 96 percent sulfuric acid solution is blended in with the other three components. This invention composition is cast as a film on an aluminum panel and cured at 150° C. for 5 minutes. The cured film exhibits no hot tack and has a Gardner reverse impact resistance of about 40 inch pounds. About 100 percent of component (B) is retained in the coating. No delamination of the cured film is apparent after the ten-minute water boil and about 5 percent blush is observable.

EXAMPLE 2

Comparative

In the manner of Example 1, a composition of like makeup is prepared except that component (B) is omitted and the quantity of component (C) is reduced to about 1.93 grams, such that the amount of curing agent is about equal to $0.43x$. A film is cast and cured in the same fashion as in Example 1. The physical properties measured are those of the cured film in Example 1. The film exhibits no hot tack with a reverse impact resistance of slightly greater than 20 inch pounds. About 90 percent of the cured film delaminates in the ten-minute water boil.

EXAMPLES 3-4

In the same manner as Examples 1 and 2, two compositions of the invention are prepared, coated and cured under the same conditions and utilizing the same materials for components (A), (C) and (D) as in Examples 1-2. For component (B) is substituted phenol and p-cresol in Examples 3 and 4, respectively. The physical properties of each composition when cured on aluminum panels are shown in the following table.

TABLE II

| | Example 1-4 | | | |
|---|---|---|---|---|
| | Example No. | | | |
| | 1<br>2-t-Butyl<br>Phenol | 2<br>(Control) | 3<br>Phenol | 4<br>p-Cresol |
| Component (A) | | | | |
| (10% Solvent) | 5 g | 5 g | 5 g | 5 g |
| Component (B) | 1.64 g | — | 1.64 g | 1.64 g |
| Component (C) | 3.20 g | 1.93 g | 3.95 g | 3.69 g |
| Calculated | .43x | .43x | .43x | .43x |
| Quantity of | + | | + | + |
| (C) | 1.79z | | 1.78z | 1.78z |
| Component (D) | .12 g | .12 g | .12 g | .12 g |
| Physicals | | | | |
| Hot Tack | None | None | None | None |
| Reverse | | | | |
| (in-lb) | ~40 | ~20 | 20-30 | 20-30 |
| Impact | | | | |
| Component (B) | | | | |
| Retention | 100% | — | 100% | 100% |
| Water Resistance at | no delam. | 90% delamination | no delam. | no delam. |
| 10 min. boil | 5% blush | | 30% blush | 100% blush |

EXAMPLE 5

Pigmented Composition

In the manner of Examples 1, 3 and 4, a composition of the invention is prepared to which titanium dioxide is added as a pigment.

EXAMPLE 6

Aminoaromatic Diluent

In the manner of Example 1, 3 and 4 a composition of the invention is prepared employing aniline as Component (B).

I claim:

1. A curable composition consisting essentially of:
   (A) x parts by weight of a hydroxyl-bearing polymer selected from the group consisting of free hydroxyl-containing polyester, free hydroxyl-containing solid epoxy resins, and homo- and copolymers of vinyl alcohol, hydroxy alkylacrylates and $\alpha,\beta$-unsaturated acids;
   (B) from 0.10x to 0.60x parts by weight, which represents y-moles, of a liquid, hydroxyl- or amino-bearing aromatic diluent represented by the formula $R(Z)_b$ wherein R is an aromatic radical of valence b having at least one reactive ring position located ortho or para to a Z substituent, b is an integer from 1 to 3 and Z is a $-NH_2$ or $-OH$ group substituted directly on an aromatic ring of R, said diluent having an atmospheric boiling point of about 150° C. or greater;
   (C) an aminoplast resin containing unreacted methylol moieties or phenolic resole resin, capable of curing component (A) to a tack-free state, present in a quantity of from (0.20x+z) to (0.50x+2.5z) parts by weight, z being equal to y multiplied by the equivalent weight of said aminoplast or phenolic resole resin; and
   (D) a catalytic amount of a catalyst which catalyzes the reaction between components (A) and (C).

2. The composition of claim 1 wherein component (B) has an atmospheric boiling point of about 175° C. or greater.

3. The composition of claim 1 wherein in component (B), b is 1 or 2.

4. The composition of claim 1 wherein in component (B), b is 1.

5. The composition of claim 1 wherein component (B) is phenol or a lower alkyl-substituted derivative thereof.

6. The composition of claim 1 wherein component (B) is aniline or a lower alkyl-substituted derivative thereof.

7. The composition of claim 1 wherein in component (B), Z is a hydroxyl group.

8. The composition of claim 1 wherein component (C) is a melamine-formaldehyde resin.

9. The composition of claim 1 wherein component (C) is present in from about 0.20x+1.25z up to about 0.50x+2z, parts by weight.

10. The composition of claim 1 wherein from about 0.0005x to about 0.05x parts by weight of component (D) are present.

11. The composition of claim 1 wherein component (D) is selected from toluenesulfonic acid, sulfuric acid, ammonium salts of either, and boron trifluoride.

12. The composition of claim 1 wherein component (A) is a free-hydroxyl containing polyester, component (B) is phenol or a lower alkyl-substituted phenol, component (C) is hexamethoxymethyl melamine and component (D) is paratoluenesulfonic acid, sulfuric acid or the ammonium salt of either.

13. The composition of claim 1 which has been heated to a temperature and for a length of time sufficient to cure same to a tack-free finish.

14. The composition of claim 1 which further contains a pigment.

* * * * *